Dec. 2, 1924.

J. HEINKEL 1,517,677

REPAIR COVER OUTFIT FOR TEST TEES OR CLEANOUT TEES

Filed Nov. 25, 1922

INVENTOR.
John Heinkel,
BY Walter N. Haskell,
his ATTORNEY.

Patented Dec. 2, 1924.

1,517,677

UNITED STATES PATENT OFFICE.

JOHN HEINKEL, OF ST. LOUIS, MISSOURI.

REPAIR-COVER OUTFIT FOR TEST TEES OR CLEANOUT TEES.

Application filed November 25, 1922. Serial No. 603,352.

*To all whom it may concern:*

Be it known that I, JOHN HEINKEL, a citizen of the United States, residing at St. Louis, in the county of St. Louis and State of Missouri, have invented certain new and useful Improvements in Repair-Cover Outfits for Test Tees or Cleanout Tees, of which the following is a specification.

My invention has reference to repair covers for test tees or cleanout tees, such as are well known in the art of plumbing. The openings to such tees, when first installed, are usually closed by a threaded plug, and frequently, when it is desired to remove such plug, it is impossible to do so without considerable effort, and injury to the threads thereon, on account of the same having become rusted in place in the opening to the tee. As different makers of pipes use different styles of threads for said openings and plugs, it is frequently a difficult matter to find a plug to replace the one which has been removed. The chief purpose of the present invention is to provide a closure for the opening which will be suitable for any style of tee, and which can be readily installed in position.

Figure 1:
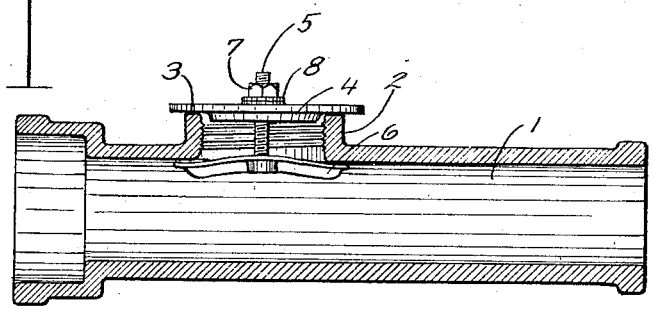
Fig. 1 is a longitudinal section of a piece of pipe having a tee opening, with my invention installed therein.
Figure 2:
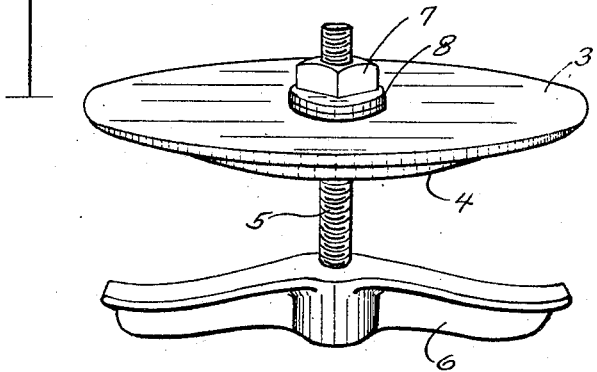
Fig. 2 is a perspective view of the device, detached.

1 indicates a section of pipe, having a tee 2, providing an opening for the purpose of testing the pipe, when it is first installed in a piece of work, or for cleaning out the pipe later. The interior of the part 2 is threaded in the usual manner to receive a similarly threaded plug, which is not shown in the drawings. Such plugs are usually fitted with a wrench-hold, and in some cases the plug cannot be removed except by the use of considerable force, resulting in the breaking of the threads on the plug, and sometimes in the wall of the opening. When this occurs, and it is found to be impossible to replace the plug satisfactorily, the pipe can be tightly closed by means of a circular plate 3, provided on one of its faces with a reduced portion 4. Said plate has a central opening to permit the passage of a threaded stem 5, connected at one of its ends with an anchor or retainer 6, capable of bridging the inner end of the opening in the part 2, and engaging with its ends the shoulder surrounding such opening, as is clearly illustrated in Fig. 1 of the drawings. The plate 3 and anchor 6 are held in proper positions, with said plate drawn tightly against the edge of the part 2, by means of a nut 7 on the outer end of the stem 5, such nut having a bearing against said plate, or against washers interposed between such nut and plate, as shown at 8. In practice, a gasket of rubber or similar material would be interposed between the plate 3 and the end of the tee, to prevent leakage of water between such parts.

The part 4 of the plate 3, projecting into the end of the part 2, prevents the plate from slipping to one side or the other, so as to permit the anchor 6 to become disengaged. Said anchor is also preferably bowed at the center, so as to resist longitudinal movement thereof when in position.

The plate 3 is formed of sufficient size to cover the end of any ordinary tee, and the device can be easily placed in position by detaching the anchor from the plate and locating it in the inner end of the tee opening, and then the plate clamped in place as set forth.

As the connection between the nut 7 and stem 5 is on the outside of the pipe, the same is not exposed to the action of the water, and the same can be easily removed when it is again desired to open the tee.

What I claim, and desire to secure by Letters Patent, is:

A device of the class described, comprising a circular plate, provided with a portion of reduced diameter on its inner face, and having central opening; an anchor-bar adapted for engagement with the inner end of a plumber's inlet tee and adaptable to openings of varying diameters; a threaded stem connected with said anchor-bar and passing through the opening in said plate; and a tapped member on said stem, adapted to hold said plate in adjusted positions with relation to said anchor-bar; said plate being capable of forming a closure for plumber's tees of varying diameters.

In testimony whereof I affix my signature.

JOHN HEINKEL.